United States Patent [19]
Davidson

[11] Patent Number: 5,435,582
[45] Date of Patent: Jul. 25, 1995

[54] SHOPPING CART

[75] Inventor: Michael B. Davidson, Toronto, Canada

[73] Assignee: In-Store Products Limited, Mississauga, Canada

[21] Appl. No.: 79,238

[22] Filed: Jun. 17, 1993

[51] Int. Cl.$^6$ .................................... B62B 3/14
[52] U.S. Cl. ........................ 280/33.992; 280/47.35
[58] Field of Search ................. 280/33.991, 33.992, 280/33.996, 47.34, 47.35, 79.3, 33.994, 33.997; 206/509

[56] References Cited

U.S. PATENT DOCUMENTS

| | | | |
|---|---|---|---|
| 2,133,834 | 10/1938 | Sheldon | 280/33.995 |
| 2,429,034 | 10/1947 | Smith et al. | 280/641 |
| 2,479,530 | 8/1949 | Watson | 280/33.991 |
| 2,687,589 | 8/1954 | Brockway | 280/33.992 X |
| 2,901,262 | 8/1959 | Berlin | 280/47.35 X |
| 3,052,484 | 9/1962 | Huffman et al. | 280/47.35 X |
| 3,534,973 | 10/1970 | Elliott | 280/47.35 X |
| 3,734,526 | 5/1973 | Propst et al. | 280/47.35 X |
| 4,324,430 | 4/1982 | Dimas, Jr. et al. | 280/33.993 X |
| 4,763,919 | 8/1988 | Nakao et al. | 280/47.35 X |
| 4,790,549 | 12/1988 | Armand | 280/47.35 X |
| 4,850,604 | 7/1989 | Marchand et al. | 280/33.996 |
| 4,923,208 | 5/1990 | Takahashi et al. | 280/47.35 X |
| 5,203,578 | 4/1993 | Davidson et al. | . |
| 5,211,263 | 5/1993 | Davidson et al. | . |

Primary Examiner—Margaret A. Focarino
Assistant Examiner—Michael Mar
Attorney, Agent, or Firm—Bachman & LaPointe

[57] ABSTRACT

A shopping cart and container apparatus for transporting merchandise within, to and from a store, includes at least one container dimensioned for containing merchandise and having a bottom, two pairs of opposed walls extending upwardly from the bottom to provide an open top, and at least one aperture in at least one of the bottom and the walls of the container; a cart for transporting the one container, including an elongated wheeled base, a frame extending upwardly from the base, a handle disposed on the frame for handling the cart, at least one rack for supporting the one container, and at least one basket carried by the frame and dimensioned for selectively containing merchandise and at least one additional container, the cart being adapted so as to be nestable with additional substantially similar carts; and a securing member associated with the cart and the at least one container for releasably securing the container to the rack, wherein the securing member includes at least one lug, carried by the cart and dimensioned to fit within at least one aperture of the container.

17 Claims, 7 Drawing Sheets

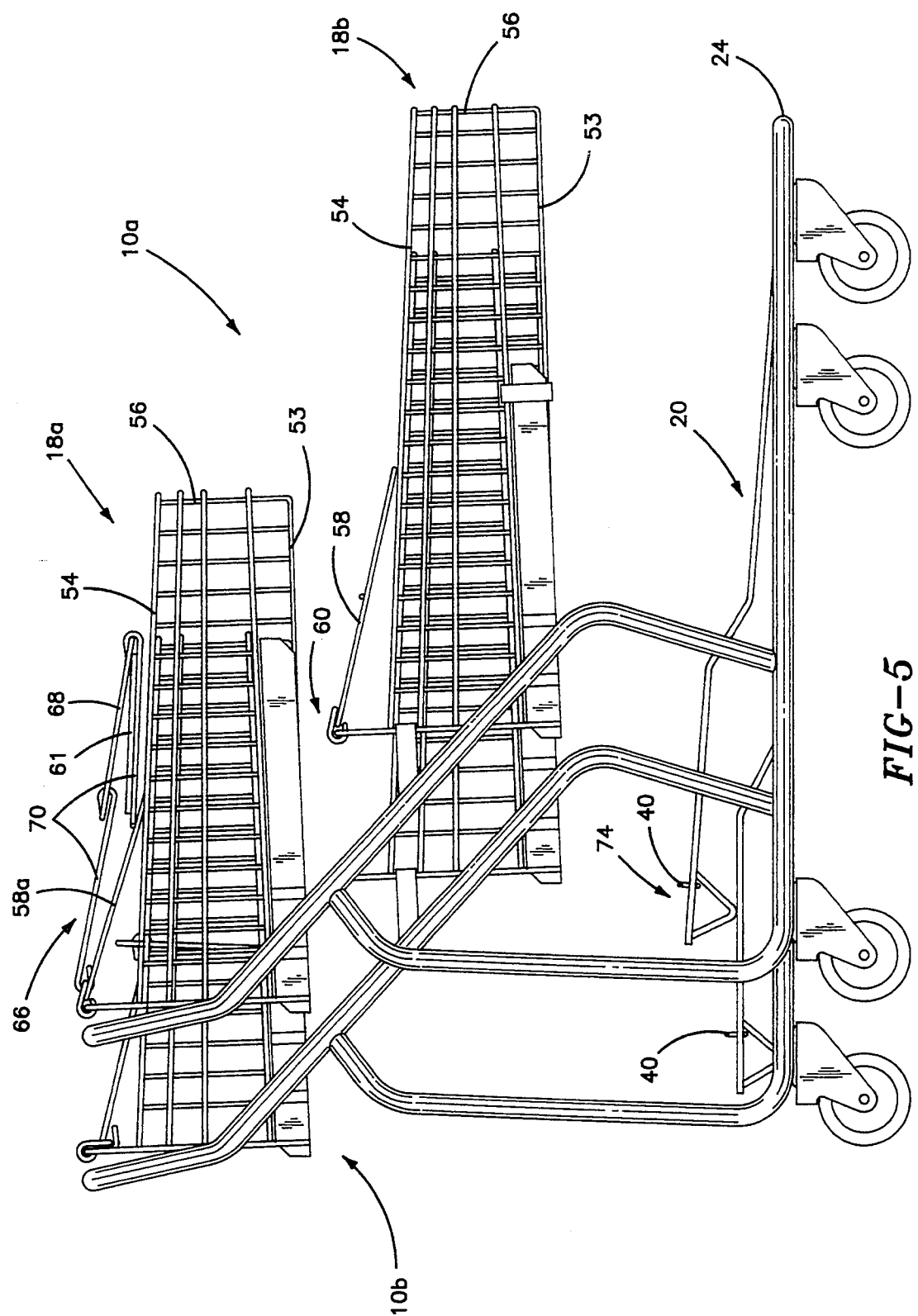

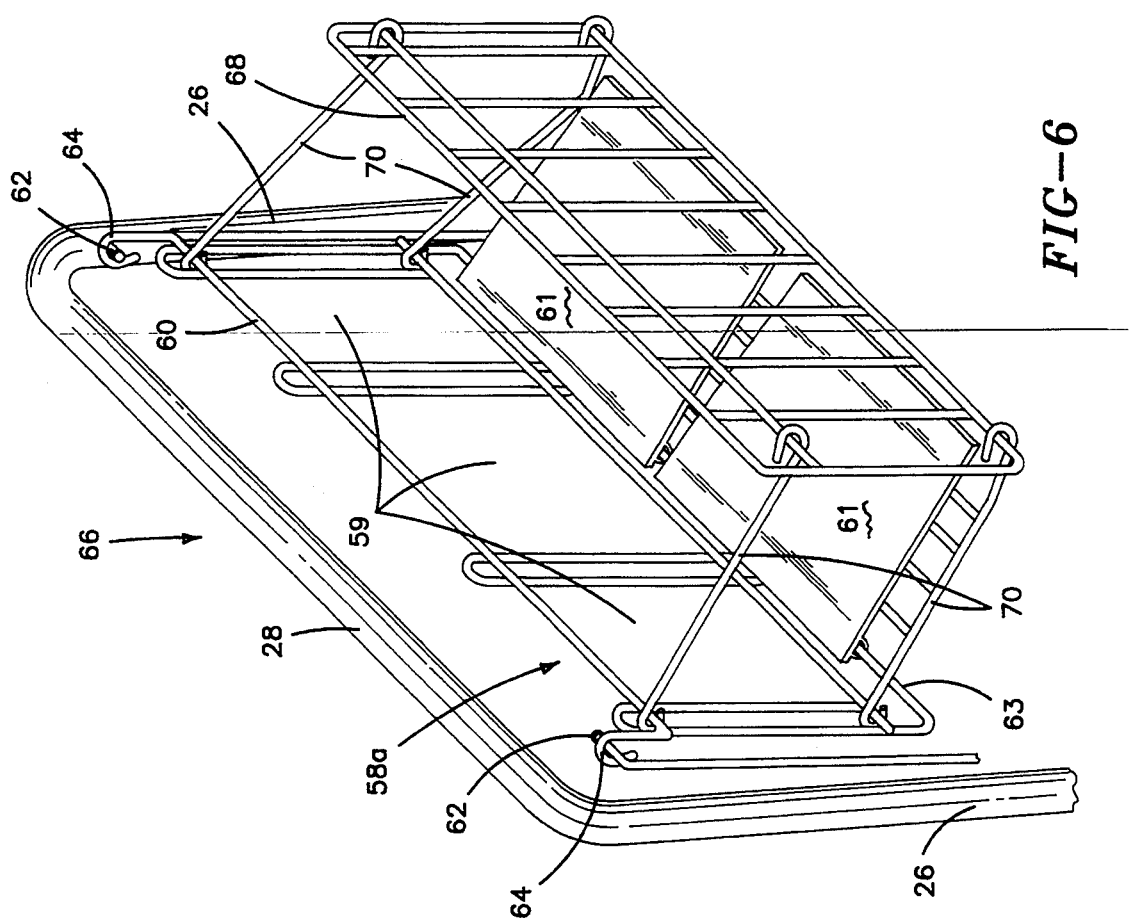

SHOPPING CART

BACKGROUND OF THE INVENTION

The invention relates to a shopping cart apparatus for transporting merchandise including groceries and the like within, to and from a store such as a supermarket or the like.

Traditionally, customers have used shopping carts comprising a relatively deep wire basket on a wheeled frame to convey groceries from their location on self-serve shelves in a supermarket to a check-out station. Once the customer arrives at the check-out station, the groceries are unloaded from the shopping cart by the customer onto a conveyor belt. The groceries are then typically passed over a bar code scanner or weighed by a cashier, and placed onto a receiving table. The groceries are then loaded into paper or plastic bags by the cashier, or alternatively "bagged" by the customer or a bag boy. The bags of groceries are then usually placed back into the shopping cart, and the shopping cart is pushed by the customer or the bag boy to the shopper's vehicle, and the bags of groceries are unloaded from the cart into the vehicle. The bags of groceries are then unloaded from the customer's vehicle and carried into the customer's premises.

The use of a traditional shopping cart in combination with plastic or paper bags as described above entails a number of inconveniences. In the case of shopping carts having relatively deep wire baskets, occasionally softer grocery items placed near the bottom of the baskets are crushed or otherwise damaged by heavier items placed thereon. Having to unload the grocery items one-by-one from the basket onto the check-out belt is a time consuming process, and often the cashier begins ringing up the customer's order before the customer finishes the unloading task, leaving the customer no opportunity to observe the cashier. Sometimes an experienced cashier is able to organize the groceries to some extent as they are being bagged, but often the groceries are placed into bags in an unorganized fashion. Further, when the bags of groceries are loaded into or unloaded from the customer's vehicle, the bags of groceries from time to time tip over or rip, spilling their contents. And from the store's point of view, providing an endless supply of plastic or paper bags is costly and detrimental to the environment.

U.S. Pat. No. 5,203,578 issued to Davidson et al. on Apr. 20, 1993, shows a shopping cart usable with containers. U.S. Pat. No. 5,211,263 issued to Davidson et al. on May 18, 1993 shows an improved check-out system.

It is therefore the principal object of the present invention to provide a shopping cart which can be used with removable containers as discussed in the '578 patent or with conventional bags or sacks or the like, so as to be universally useful.

It is a further object of the invention to provide such a cart wherein receptacles for goods have a shallower depth than the baskets of conventional shopping carts so as to avoid damage to articles placed therein.

It is still a further object of the invention to provide such a cart which is nestable with other like carts for storage.

Other objects and advantages will appear hereinbelow.

SUMMARY OF THE INVENTION

The present invention addresses many of the disadvantages of the prior art and attains the aforesaid objects.

According to the invention, a shopping cart and container apparatus is provided which comprises at least one container dimensioned for containing merchandise and comprising a bottom, two pairs of opposed walls extending upwardly from the bottom to provide an open top, and at least one aperture in at least one of the bottom and the walls of the container, cart means for transporting said container, comprising an elongated wheeled base, a frame extending upwardly from the base, handle means disposed on the frame for handling the cart, at least one rack carried by the base, said rack including shelving means for supporting said container, and at least one basket carried by the frame and dimensioned for selectively containing merchandise and at least one additional container, the cart means being adapted so as to be nestable with additional substantially similar cart means, and securing means associated with the cart for releasably securing said container to the shelving means, wherein the securing means comprises at least one lug, carried by the cart and dimensioned to fit within the at least one aperture of the at least one container.

An improved shopping cart is also provided with a plurality of baskets which are at least partially laterally spaced or staggered, and vertically spaced, so as to offer convenient access to all baskets, and wherein each basket preferably has a depth shallower than conventional shopping carts.

BRIEF DESCRIPTION OF THE DRAWINGS

A detailed description of the preferred embodiments of the invention follows, with reference to the accompanying drawings, wherein:

FIG. 5 is a side view illustrating the nesting of multiple carts for storage;

FIG. 6 illustrates the partitioning of an upper basket of a cart according to the invention so as to provide a child seat;

DETAILED DESCRIPTION

The invention relates to a shopping cart apparatus, and especially a shopping cart and container system, for transporting merchandise within, to and from stores such as grocery stores, supermarkets, outlet type stores and the like.

Figure 1:
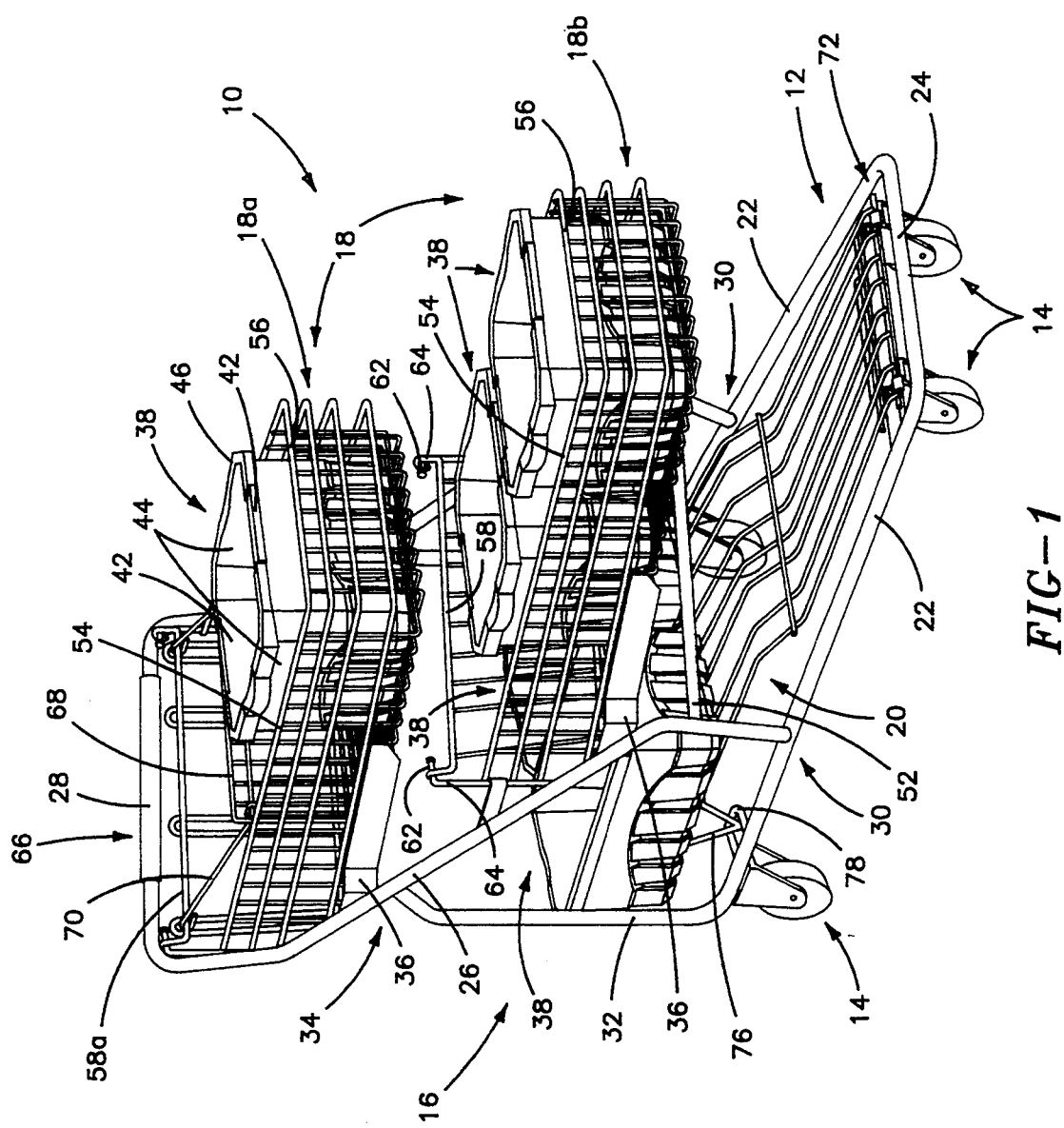
FIG. 1 is a perspective view of a shopping cart according to the invention, holding a plurality of containers for containing merchandise.

FIG. 1 illustrates a preferred embodiment of a shopping cart according to the invention, generally referred to herein by reference numeral 10.

Cart 10 preferably has a base 12 having standard wheel assemblies 14 disposed thereon, preferably at corners of base 12. A frame 16 is disposed on base 12, and preferably carries at least one, and preferably two basket structures 18, as well as at least one rack structure 20.

Base 12 preferably comprises two substantially rigid longitudinal side bars 22, preferably joined at a front portion thereof by a transverse front bar 24. Bars 22 and bar 24 may suitably be a single bar bent to the proper configuration as shown in FIG. 1. Bars 22 and bar 24 may preferably be made from one inch square tubing although, of course, any other material may suitably be used as desired.

Frame 16 includes two generally upstanding side frame bars 26 each preferably horizontally inclined and each extending upwardly from each longitudinal bar 22. Top portions of side frame bars 26 are preferably joined by a handle 28 for handling cart 10, that is, for maneuvering and pushing cart 10 during use. Handle 28 and side frame bars 26 may of course be fabricated from a single pipe member bent to the proper configuration, and may be attached to longitudinal side bars 22 at junctions 30 through any suitable and conventional means such as, for example, welding, mechanical fasteners such as sleeves, nuts, bolts and/or flanges or the like. In order to provide a more rigid frame structure, side bars 22 preferably extend, at a rear portion thereof, in a generally upward direction so as to provide additional frame support bars 32 as shown. Support bars 32 preferably meet with and are joined to side frame bars 26, for example at junction 34, and may be joined as above through any conventional means.

Frame 16 preferably supports or carries basket structures 18, while base 12 supports or carries at least one rack structure 20. Baskets 18 may suitably be attached to frame 16 through any desired and conventional means such as, for example, bracket structures 36. Rack 20 is preferably supported by base 12 in a manner to be described below.

Figure 4:
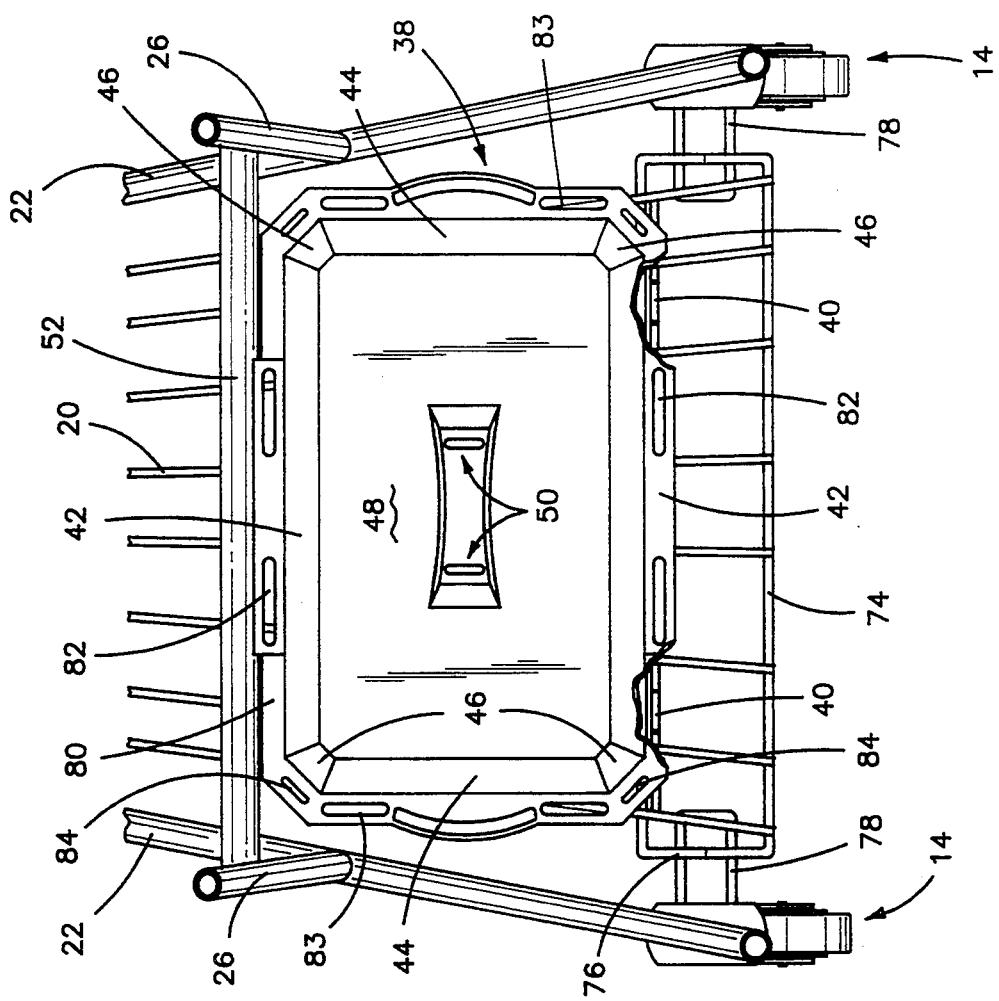
FIG. 4 is a top view of the lower rear portion of a cart according to the invention, illustrating an alternate releasable attachment of a container.

According to the invention, a number of containers 38 are advantageously provided to be carried by cart 10. Containers 38, shown from various views in FIGS. 1, 3 and 4, each preferably have a pair of opposed side walls 42 and opposed end walls 44 joined together at angled corners 46 and extending upwardly from bottom 48. As shown in FIG. 4, containers 38 preferably have at least one aperture 50 located in bottom 48 thereof. Containers also preferably have side apertures 82, end apertures 83 and/or corner apertures 84 arranged in walls 42, 44, and preferably positioned in laterally extending lip portion 80 of walls 42, 44 of containers 38. FIG. 1 shows cart 10 carrying a total of five containers 38, one in partitioned upper basket 18a, two in lower basket 18b, and two on rack 20. Such a configuration provides cart 10 with a large capacity for merchandise in easily accessible locations and, advantageously, provides a cart 10 which can be used with containers 38, as described hereinbelow, or without containers, wherein merchandise is contained in baskets 18a and 18b as well as on rack 20. In this regard, baskets 18 are preferably sized so as to selectively receive either merchandise or containers 38 for merchandise.

Rack 20, in accordance with the invention, provides a shelving structure to receive one or more containers 38. Rack 20 preferably has one or more upwardly extending lugs 40 (FIG. 2) which interact with apertures 50 of containers 38 to releasably hold containers 38 to rack 20 in position for use. Lugs 40 may suitably be defined by upwardly bent wire portions of wire latticework of rack 20.

Figure 3:
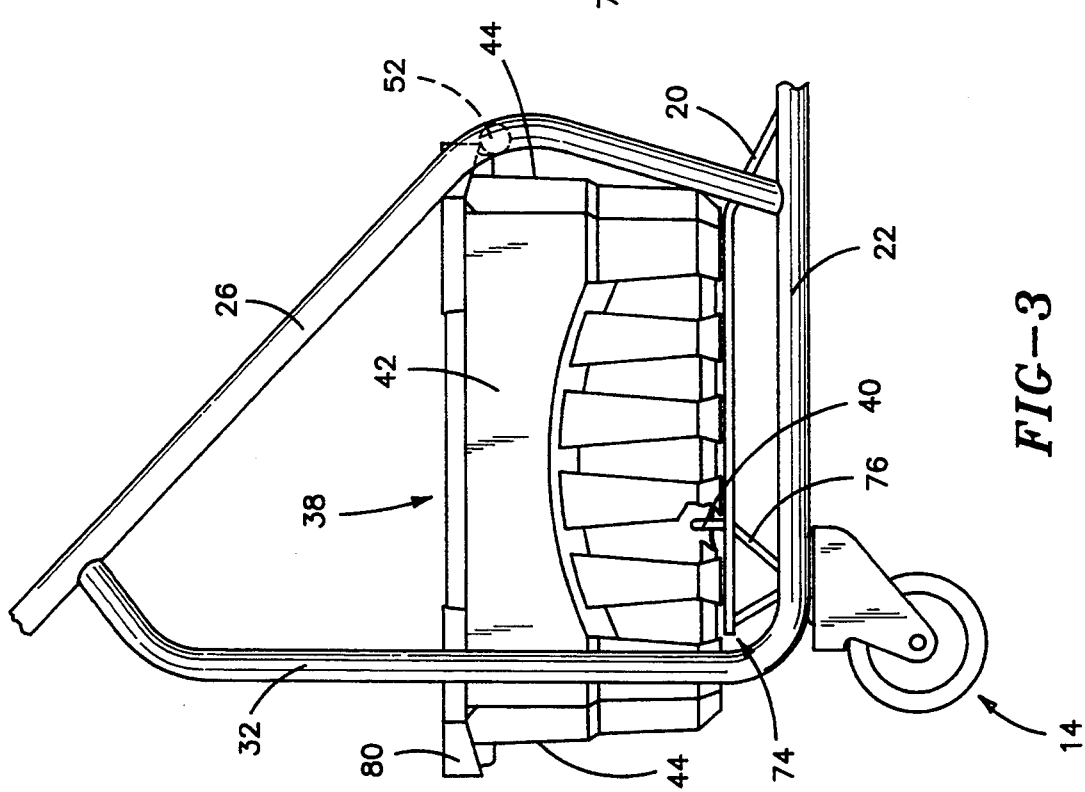
FIG. 3 is a side view, partially broken away, of a lower rear portion of the cart of FIG. 1, showing the releasable attachment of a container.

FIGS. 3 and 4 illustrate two modes of positioning of containers 38 on rack 20. FIG. 3 illustrates the longitudinal positioning of such a container 38 suitable to hold two containers on rack 20 as shown in FIG. 1, while FIG. 4 illustrates transverse positioning suitable to hold a single container.

FIG. 3 shows a partially broken away view of container 38 positioned longitudinally on rack 20. Aperture 50 is arranged in bottom 48 so as to receive lug 40 when container 38 is positioned longitudinally on rack 20 to firmly and releasably hold container 38 in place. A portion of side wall 42 of container 38 is broken away in the drawing so as to show this lug 40 more clearly. Frame 16 may suitably further include a transverse bar 52 extending between side frame bars 26 disposed relative to lugs 40 so that containers 38, when positioned on rack 20 engaging lugs 40 contact bar 52 and are further supported at their respective end walls 44 by transverse bar 52. Two lugs 40 may preferably be provided on rack 20 and arranged so as to receive two longitudinally arranged containers 38 (as shown in FIG. 1) with lugs 40 in apertures 50 thereof.

FIG. 4 shows an alternate positioning of a single container 38, arranged transverse or sideways on rack 20. When container 38 is positioned in this manner, lugs 40 do not engage aperture 50. Rather, container 38 is held in place between lugs 40 and bar 52. Lugs 40 contact container 38 at a lower portion of one side wall 42 as shown in the broken away portion of container 38, and bar 52 contacts the other side wall 42 of container 38. An alternate embodiment of a lug structure for securing one or two containers 38 on rack 20 is described below with reference to FIGS. 7–9.

The use of containers 38 is advantageous as merchandise can be segregated as desired during shopping. Unloading cart 10 at checkout is accomplished by simply placing the full containers 38 on the counter, thereby allowing the consumer to watch the clerk while items are priced or "rung up" and transferred from a full container to an empty container for transportation on the cart. Furthermore, inconvenience involved with bags which may rip or spill during transport and which must be provided by the store is avoided. However, cart 10 according to the invention is also useful without containers 38 if desired, as merchandise can still be placed in the easily accessible baskets 18a and 18b as will be more fully described hereinbelow.

Returning to FIG. 2, baskets 18 are preferably formed by a lattice-work wire structure which defines a bottom 53, two side walls 54 and a front wall 56 all extending upwardly from the bottom. Lower basket 18b also has a rear wall 58 also extending upwardly from bottom 53. Baskets 18 are dimensioned to receive merchandise to be carried in cart 10. Cart 10 is preferably provided with a plurality of baskets 18, most preferably with two baskets 18 as shown. Baskets 18 are preferably spaced both laterally and vertically to provide an at least partially staggered structure. In this manner, each basket 18 may be provided with a shallower depth than a single deep basket of conventional shopping carts, while maintaining a large carrying capacity, thus avoiding the piling on of goods common to deep baskets. Furthermore, because of the staggering and vertical spacing, upper 18a and lower 18b baskets are both readily accessible. It is noted that cart 10 according to the invention provides baskets 18 which extend forwardly beyond the forward edge of containers 38 positioned on rack 20 of cart 10, as is readily apparent in FIG. 1. This configuration provides cart 10 with a large capacity for goods and merchandise. Further, containers 38 and baskets 18a and 18b are readily accessible for the placement and removal of such goods and merchandise, while containers 38 are also themselves readily accessible when placed on rack 20 and in baskets 18a and 18b.

Baskets 18 are preferably dimensioned to receive one or more containers 38 so that cart 10 may be used to contain merchandise loosely in baskets 18 for purchase and then placement in baskets or in conventional bags or sacks. Also, containers 38 may be releasably disposed both on rack 20 and in baskets 18 as illustrated in FIG. 1. In this regard, baskets 18a and 18b have a vertical spacing between respective bottom portions 53 thereof which spacing is greater than the height of containers 38. This vertical spacing is sufficient to allow convenient placement and removal of containers 38, as well as access to containers 38 when placed on cart 10 for use. Moreover, the staggered relationship of baskets 18a and 18b permits easy access to the containers on basket 18b. Walls 54, 56 and 58 of baskets 18 also preferably have a height which is less than the height of containers 38. Containers 38 are therefore readily accessible, even when disposed in lower basket 18b, and are easily placed on and removed from cart 10.

According to the invention, carts 10 are readily nestable, one within another, so that a plurality of carts can be nested together for storage. FIG. 5 illustrates the nesting of two carts 10a and 10b, with cart 10b nested within cart 10a. As shown, nesting is preferably provided by adapting rear walls or trailing edges of baskets 18 and racks 20 to be pivotable or hinged so that when cart 10b is pressed against the rear of cart 10a, the front or leading edges of cart 10b contact the pivotable trailing edges of cart 10a and pivot them so that baskets 18 and racks 20 of cart 10b are nested within baskets 18 and racks 20 of cart 10a. Of course, an unlimited number of structurally corresponding or substantially corresponding carts could be nested for storage in this manner.

Rear wall 58 of lower basket 18b is hinged for pivot along a top edge 60 thereof. Baskets 18a and 18b preferably include two opposed and inwardly disposed extensions 62 (see also FIGS. 1 and 2) of the wire latticework of side walls 54. Rear wall 58 has hook portions 64 extending from a top edge thereof and encircling extensions 62 so as to provide an inward pivot of rear wall 58, that is, a pivot into the inner space of basket 18. Extensions 62 are preferably somewhat elevated, as shown, so that pivot of rear wall 58 provides an opening of sufficient height to receive the front end of a subsequent basket 18 for nesting.

Figure 2:
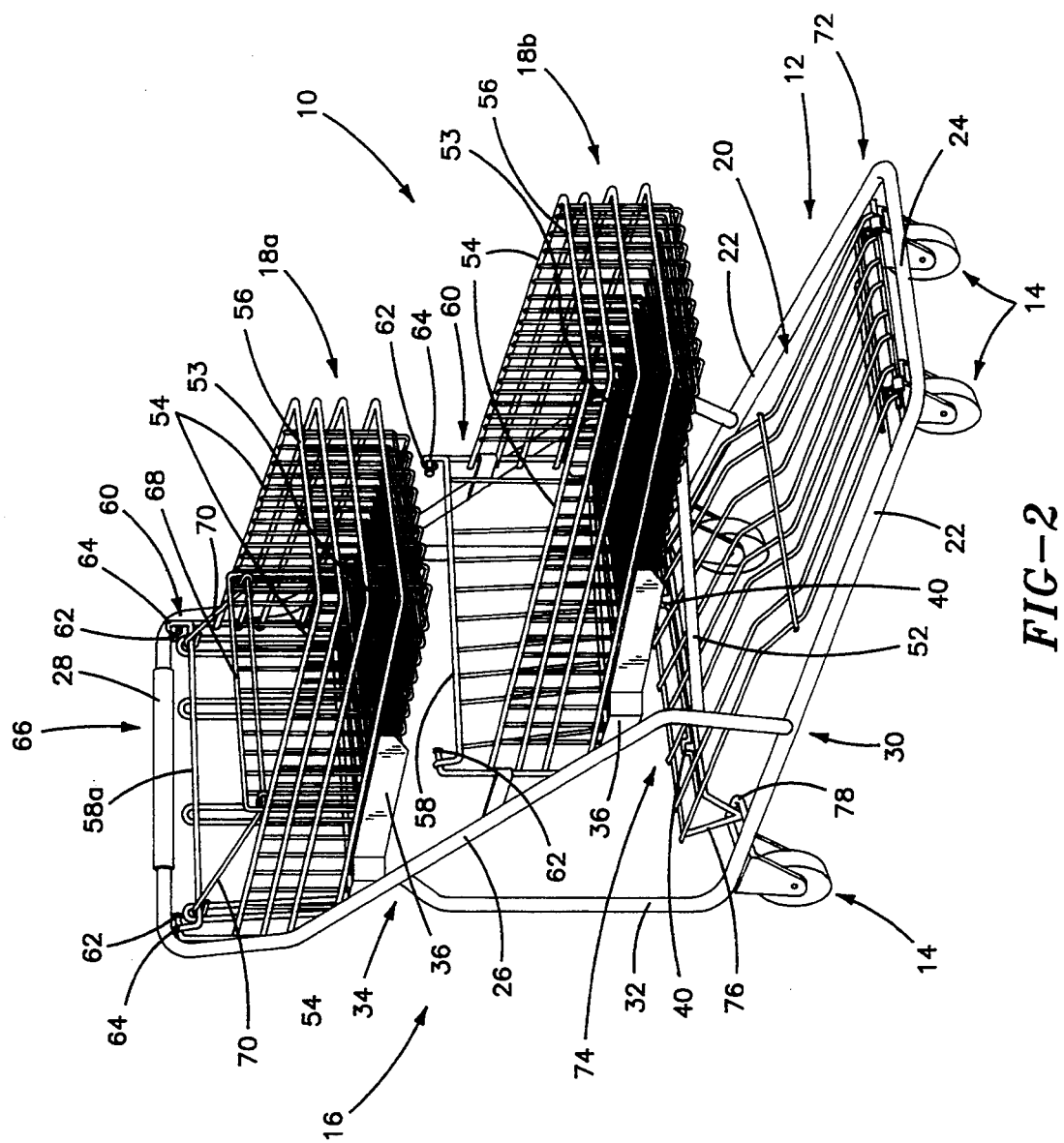
FIG. 2 is a perspective view of a shopping cart similar to that of FIG. 1, with the containers removed.

Baskets 18 are also preferably tapered in width from the rear to the front (as best shown in FIGS. 1 and 2) so as to further accommodate nesting. Additionally the staggered configuration and shorter relative length of baskets 18a and 18b further facilitate nesting.

Upper basket 18a is preferably provided with a child seat structure 66, which may be separated off and defined from upper basket 18a by a partition wall 68. Partition wall 68 may suitably be positioned, and upper basket 18a dimensioned, so as to receive at least one container 38 in the forward non-child seat structure portion of upper basket 18a as shown in FIG. 1.

FIG. 6 provides an enlarged view of a portion of upper basket 18a and child seat structure 66. The wire lattice-work of rear wall 58a of basket 18a may preferably be arranged so that gaps or spaces 59 are provided for a child's legs. Of course, numerous gaps 59 may be provided to accommodate two or more children depending upon the width of cart 10 and child seat structure 66. It is a particular advantage of the present invention that child seat 66 readily accommodates two children. One or more flaps 61 are also preferably arranged on child seat structure 66 and are pivotable between a substantially horizontal position wherein they may further serve as a seat portion of child seat 66, and a substantially vertical position (not shown) wherein flaps 61 block gaps 59 so that the area of child seat 66 can be further used to contain merchandise or other items if desired. Flaps 61 are pivotably attached to the lower edge 63 of rear wall 58a as shown.

Child seat structure 66 must also be pivotable, according to the invention, in order to allow carts 10 to be nested. In order to provide proper nesting of child seat structure 66, both rear wall 58a and partition wall 68 should be pivotable. FIG. 6 illustrates a preferred embodiment wherein rear wall 58a is pivotably mounted to basket 18a through extensions 62 and hook portions 64 as described above relative to basket 18b. Partition wall 68 is pivotably connected to rear wall 58a via a plurality (preferably four as shown) of rods 70 pivotably attached at respective ends thereof to rear wall 58a and partition wall 68. Such a configuration, when viewed from the side, provides a generally quadrilateral shape to the rear wall 58a—partition wall 68—rods 70 structure. This structure allows pivoting of the elements at each corner thereof so as to advantageously allow a general flattening of the child seat structure 66 during pivot thereof, (as shown in FIG. 5).

Nesting of racks 20 of carts 10 is preferably provided by pivotably mounting rack 20 to cart 10 at a front edge 72 of rack 20. Rear or trailing edge 74 of rack 20 preferably rests on base 12 or frame 16 without being connected thereto. Rack 20 is preferably also provided with a gentle downward inclination toward front edge 72. In this way, rack 20 readily pivots upwardly at rear edge 74 thereof (as shown in FIG. 5) to receive the incoming front edge 72 of the next cart, in this case front or transverse bar 24 of base 12, of a subsequent cart 10 to be nested. Base 12 and rack 20 also preferably have a gradually tapering width from rear to front so as to further facilitate nesting of carts 10.

Rack 20 may preferably rest on base 12 through downwardly extending lugs 76 which may suitably be formed from a bent portion of the wire lattice-work of rack 20. Lugs 76 may suitably rest on inwardly disposed support members 78 which may, for example, be formed from inwardly projecting wire portions attached, as shown, to base 12. The height of lugs 76 may suitably be provided so as to incline rack 20 downwardly toward the front as described above.

Walls 42, 44 of containers 38 preferably include lip portions 80 extending laterally from the tops of walls 42, 44. Lip portions 80 of side walls 42 preferably have a number of side apertures 82, and lip portions 80 of end walls 44 preferably have a number of end apertures 83. Various elements of cart 10 may be provided with additional lugs or locking pins (not shown), and side and end apertures may suitably be dimensioned to receive such additional lugs or locking pins so as to provide more secure attachment of container 38 to cart 10. Such additional lugs and/or locking pins could be provided on baskets 18 or rack 20, and with regard to basket 18, the additional lugs or locking pins are preferably formed along wall portions of basket 18 so as to maintain a flat bottom of baskets 18 which does not damage, rip or catch the bottoms of conventional bags or sacks which may be placed in baskets 18 when containers 38 are not used. Side apertures 82 and/or corner apertures 84 may also suitably be used for attachment of a carrying member or handle (not shown) to containers 38 to facilitate carrying of same.

Figure 8:
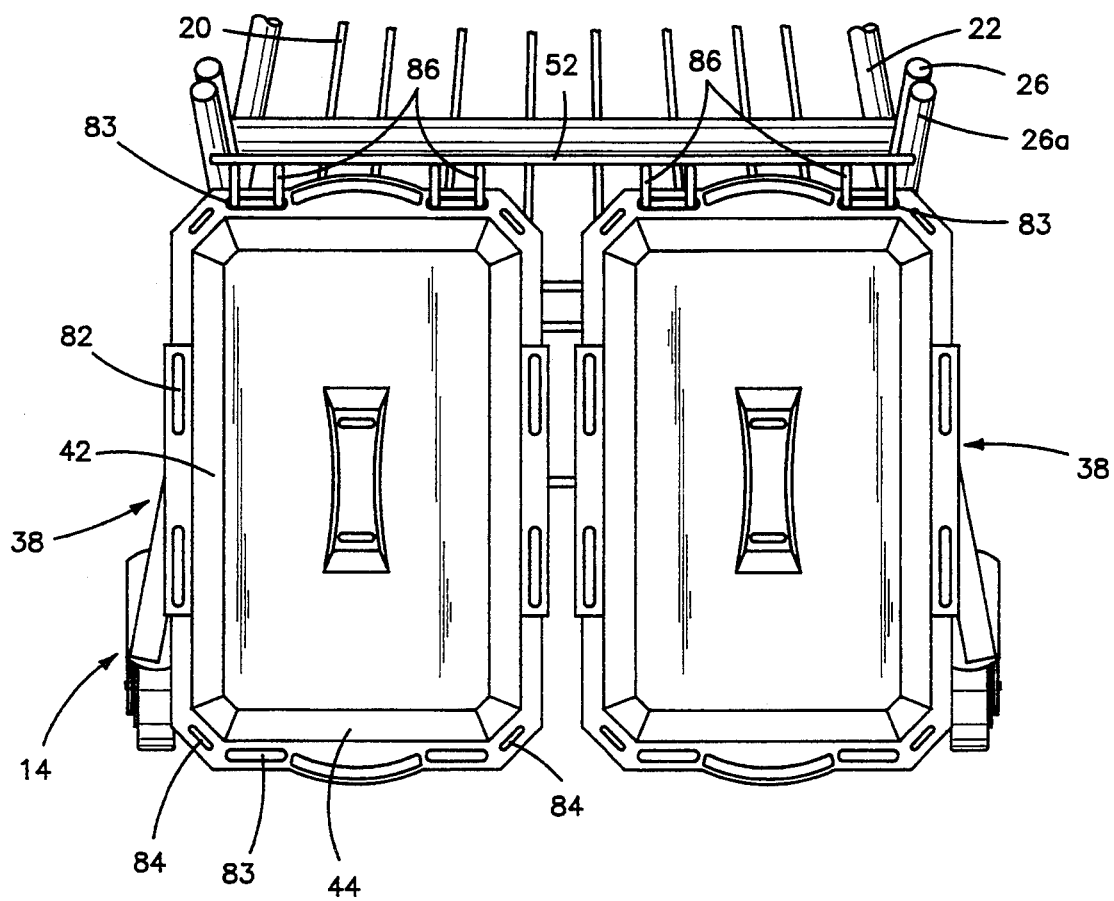
FIGS. 8 and 9 are top views of the alternate embodiment of FIG. 7.
Figure 7:
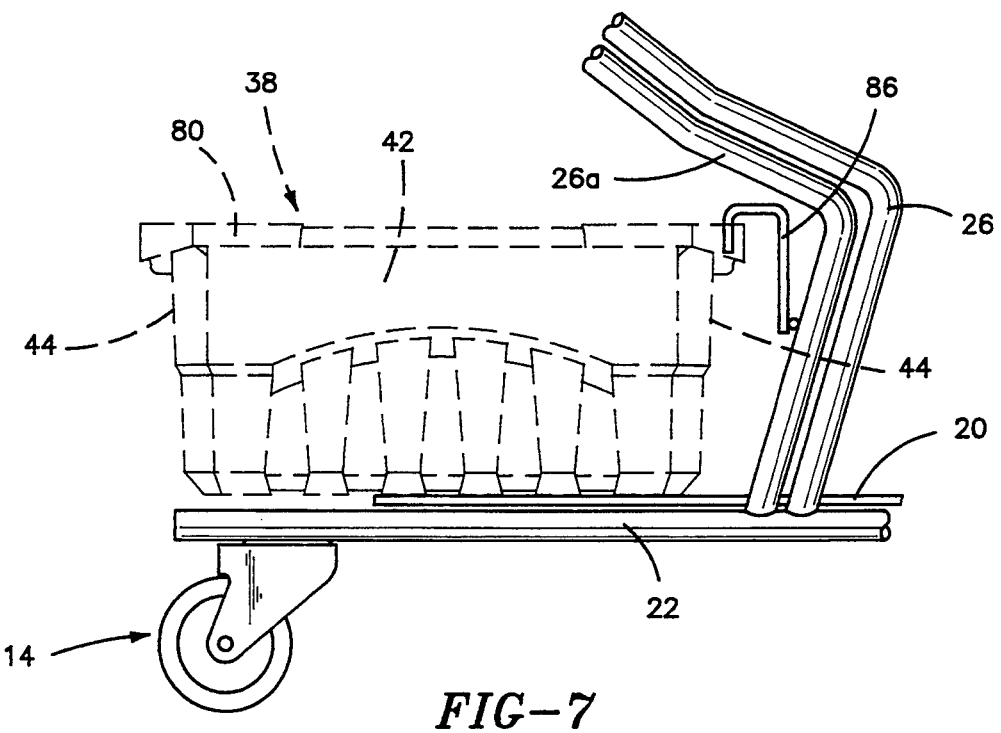
FIG. 7 is a side view of an alternate embodiment of the invention.
Figure 9:
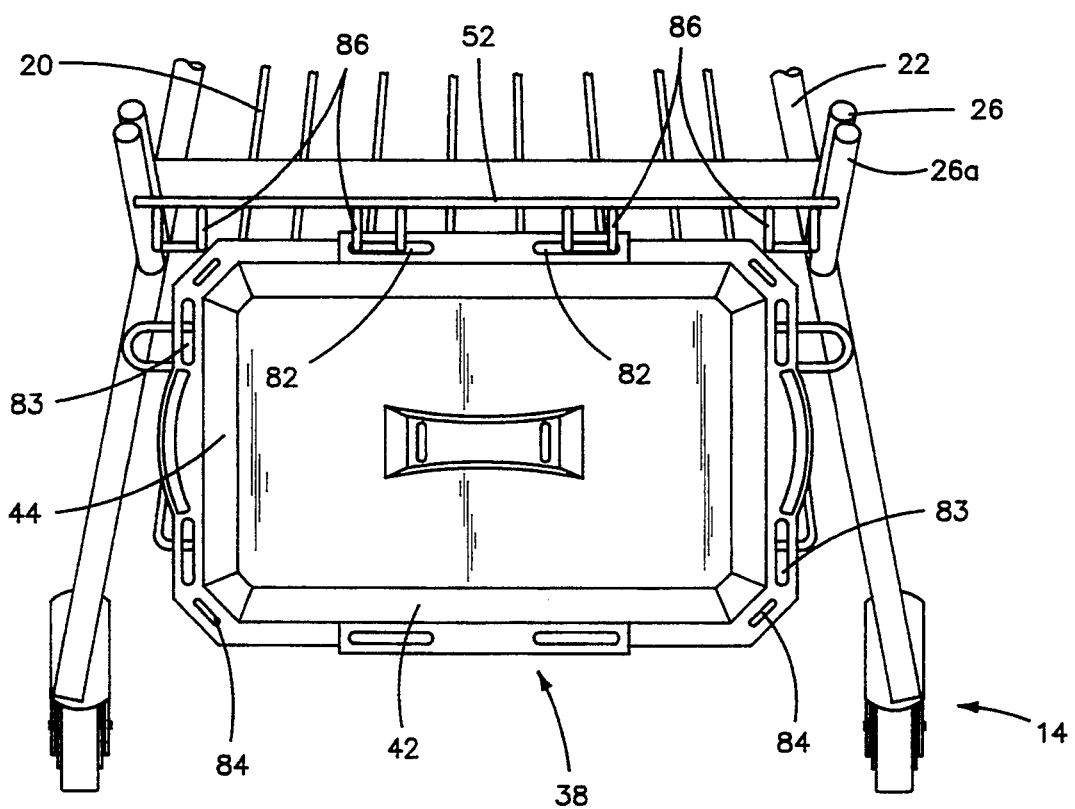

FIGS. 7-9 illustrate an alternate embodiment of a lug structure for engaging containers 38 through side apertures 82 and/or end apertures 83.

FIG. 7 shows containers 38 held to rack 20 by lugs 86 attached to frame 16 of cart 10 so as to engage end apertures 83 of containers 38. Lugs 86 are preferably formed as a wire member arranged so as to extend horizontally over lip 80 of a container 38 positioned on rack 20, and to then extend downwardly for insertion into end apertures 83.

It should be noted that apertures 82, 83 could be positioned at any point in walls 42, 44, and lugs 86 would then be provided accordingly for insertion into such apertures 82, 83. Further, lugs could be arranged for upward insertion into apertures, downward insertion, or even lateral insertion if desired. Thus, numerous configurations of apertures and lugs are contemplated and within the scope of the invention.

In this manner, containers 38 are firmly and releasably held to frame 16. As shown in FIG. 8, a plurality of lugs 86 may be arranged along frame 16 so that two containers may be held to rack 20 via end apertures 83 located in end walls 44 of containers 38. Additionally, the spacing of lugs 86 is such that a single container 38 may also be held transversely or sideways to rack 20 by two lugs 86 engaging side apertures 82 as shown in FIG. 9. Thus, in this embodiment, one or two containers can be releasably held to rack 20 as desired. It should be noted that lugs 86 could suitably extend upwardly from frame 16 and upwardly into side or end apertures 82, 83 if desired, without departing from the teachings of the invention. Cart 10 may also be provided with both lugs 40 and lugs 86, whereby containers 38 are engaged at both aperture 50 and side or end wall apertures 82, 83.

It is also noted that FIGS. 7-9 illustrate an alternate embodiment of frame 16 wherein two substantially parallel side frame bars 26, 26a are provided. In this regard, it should be noted that any frame structure could suitably be used so long as proper positioning of baskets 18 and rack 20 are provided and the frame is structurally stable and rigid. The actual configuration of frame members is, of course, not critical.

Thus disclosed is a shopping cart and container system which may suitably be used to eliminate the need for conventional bags and their inherent disadvantages, while maintaining excellent carrying capacity of the cart, allowing a shopper greater freedom to monitor actions of the check out clerk, further allowing the shopper to group items for purchase in particular containers as desired, and further still avoiding the risk to merchandise of damage from resting at the bottom of a deep conventional shopping cart.

Further, merchants can still provide the shopping cart for use with many of the above advantages even if no containers are used although, if containers are used, the merchant need not provide conventional shopping bags, etc. Carts are also conveniently nested for storage in a minimal amount of space.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A shopping cart and container apparatus for transporting merchandise, comprising:

at least one container having a particular size and configuration and dimensioned for containing merchandise and comprising a bottom, two pairs of opposed walls extending upwardly from the bottom to provide an open top, and at least one aperture in at least one of the bottom and the walls of the container;

cart means for transporting said container having a front and an open rear thereof and having laterally spaced apart frame portions, comprising an elongated wheeled base; a frame extending upwardly from the base defining an open faced rear portion; handle means disposed on the frame for handling the cart; at least one lowermost rack means for supporting said at least one container, the rack means having a front portion and a rear portion; and at least one fixed basket carried by the frame and dimensioned for selectively containing merchandise and at least one additional container, the cart means being adapted so as to be nestable with additional substantially similar cart means; and securing means for securing one container in transversely extending position between said laterally spaced apart frame portions and for securing a pair of said one containers in a longitudinally extending position between the laterally spaced apart frame portions, said securing means associated with the cart means for releasably securing said at least one container solely to the rear portion of the rack means facing the open rear of the cart means so that said container covers only said rear portion, wherein the securing means comprises at least one lug, carried by the cart means and dimensioned to fit within said aperture of said container, wherein the largest dimension of said at least one container is smaller than the distance between the laterally spaced apart frame portions, providing that said at least one container fits within the open faced rear frame portion permitting removal thereof in a direction from the rear of the cart means.

2. The apparatus as defined in claim 1, wherein the rack comprises a lattice-work of wires, and wherein said lug is formed from an upwardly protruding piece of wire.

3. The apparatus according to claim 2, wherein the container has at least one aperture in the bottom, and wherein the lug is formed on the rack means so as to engage the aperture in the bottom of the container.

4. The apparatus according to claim 3, wherein the rack is downwardly inclined relative to the horizontal from the rear to the front of the cart.

5. The apparatus according to claim 4, wherein the frame includes a transverse bar arranged relative to the lug so as to further support said container at an edge thereof when said container is secured onto the rack means.

6. The apparatus according to claim 5, wherein the transverse bar is arranged relative to the lug so as to support a single container arranged transverse to the cart.

7. The apparatus according to claim 1, wherein the container has at least one aperture in at least one wall of the container.

8. The apparatus according to claim 7, wherein the lug comprises a member extending upwardly and horizontally over the wall of the container, and then extending downwardly for engagement with the aperture.

9. The apparatus according to claim 1, wherein said basket is arranged sufficiently above said rack to accommodate the height of said container.

10. The apparatus according to claim 9, wherein the basket is arranged sufficiently forward of at least a portion of the rack so as to allow access to containers mounted to said rack.

11. The apparatus according to claim 1, wherein the cart includes two fixed baskets arranged in staggered and vertically spaced relationship so as to allow access to merchandise held in both of the two baskets.

12. The apparatus according to claim 11, wherein each basket includes a wire lattice-work defining a bottom, a pair of upwardly extending side walls, and upwardly extending front and back walls, wherein the rack has a leading edge disposed generally toward the front of the cart, and a trailing edge disposed generally toward the rear of the cart, and wherein the trailing edge of the rack and the back wall of each basket are pivotable to a nesting position, with the trailing edge of the rack being pivotable so as to receive the leading edge of a rack of a subsequent cart and within the back wall of each basket is pivoted so as to receive a front wall of a corresponding basket of a subsequent cart, whereby multiple shopping carts can be nested for storage.

13. The apparatus according to claim 12, wherein the rack is pivotably mounted to the frame at the leading edge, wherein the trailing edge of the rack rests against the frame in the unnested position, and wherein the rack is upwardly pivotable around the leading edge to lift the trailing edge when the shopping cart is nested.

14. The apparatus according to claim 13, wherein the two baskets each have a length shorter than the wheeled base, whereby nesting of multiple shopping carts is facilitated.

15. The apparatus according to claim 12 including an upper basket having partition means for dividing the upper basket into a storage area dimensioned for containing merchandise and a child seat means.

16. The apparatus according to claim 15, wherein the upper basket comprises a wire lattice-work defining a bottom, a pair of upwardly extending side walls, and upwardly extending front and back walls, wherein the back wall and the partition means define child seat means of the upper basket, wherein the wire lattice-work of the back wall is provided with a plurality of leg holes for the child seat means, and wherein the back wall and the partition means are pivotable so as to receive the front wall of the upper basket of a subsequent shopping cart, whereby a plurality of shopping carts can be nested for storage.

17. The apparatus according to claim 1, wherein the basket extends forwardly of a forward edge of said container.

* * * * *